United States Patent
Kim et al.

(10) Patent No.: US 9,887,048 B2
(45) Date of Patent: Feb. 6, 2018

(54) STRETCHABLE SUPERCAPACITOR AND METHOD OF MANUFACTURING THE SAME

(71) Applicant: Samsung Electronics Co., Ltd., Suwon-si, Gyeonggi-do (KR)

(72) Inventors: Taeho Kim, Suwon-si (KR); Jangwook Choi, Daejeon (KR); Yonghee Lee, Daejeon (KR)

(73) Assignees: SAMSUNG ELECTRONICS CO., LTD., Gyeonggi-Do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 135 days.

(21) Appl. No.: 14/882,846

(22) Filed: Oct. 14, 2015

(65) Prior Publication Data
US 2016/0247636 A1    Aug. 25, 2016

(30) Foreign Application Priority Data

Feb. 24, 2015    (KR) ........................ 10-2015-0025923

(51) Int. Cl.
*H01G 11/66*    (2013.01)
*H01G 11/52*    (2013.01)
(Continued)

(52) U.S. Cl.
CPC ............. *H01G 11/66* (2013.01); *H01G 11/14* (2013.01); *H01G 11/28* (2013.01); *H01G 11/52* (2013.01);
(Continued)

(58) Field of Classification Search
CPC ........ H01G 11/66; H01G 11/68; H01G 11/84; H01G 11/14; H01G 11/28; H01G 11/52; H01G 11/86; H01G 11/38; H01G 11/36
See application file for complete search history.

(56) References Cited

U.S. PATENT DOCUMENTS 6,426,863 B1 *   7/2002   Munshi ................. H01G 9/038
                                                 361/503
6,717,795 B2 *   4/2004   Nakazawa ............ H01G 9/155
                                                 361/502
(Continued)

FOREIGN PATENT DOCUMENTS

JP        11-102686 A        4/1999
JP        2001-217162 A      8/2001
(Continued)

OTHER PUBLICATIONS

Yu et al., Stretchable Supercapacitors Based on Buckled Single-Walled Carbon Nanotube Macrofilms, Adv. Mater. 2009, 21, 4793-4797.*

(Continued)

*Primary Examiner* — David M Sinclair
(74) *Attorney, Agent, or Firm* — Harness, Dickey & Pierce, P.L.C.

(57) ABSTRACT

Provided is a stretchable supercapacitor and a method of manufacturing the same. The stretchable supercapacitor includes a separator between first and second current collectors. The first and second current collectors each including an active material. The second current collector is on the first current collector. The separator includes an electrolyte. Each of the separator, the first current collector and the second current collector includes an elastic polymer layer. The first and second current collectors may each have a 3-dimensional nano-pore structure. The stretchable supercapacitor may further include a first electrode in contact with the first current collector and a second electrode in contact with the second current collector. The elastic polymer layers may include at least one of styrene-b-butadiene-b-styrene (SBS), polyurethane, polyurethane acrylate, acrylate polymer, acrylate terpolymer, and silicone-based polymer.

19 Claims, 13 Drawing Sheets

(51) Int. Cl.
*H01G 11/86* (2013.01)
*H01G 11/28* (2013.01)
*H01G 11/14* (2013.01)
*H01G 11/68* (2013.01)
*H01G 11/84* (2013.01)
*H01G 11/36* (2013.01)
*H01G 11/38* (2013.01)

(52) U.S. Cl.
CPC ............. *H01G 11/68* (2013.01); *H01G 11/84* (2013.01); *H01G 11/86* (2013.01); *H01G 11/36* (2013.01); *H01G 11/38* (2013.01); *Y02E 60/13* (2013.01)

(56) References Cited

U.S. PATENT DOCUMENTS

| | | | | |
|---|---|---|---|---|
| 7,936,555 | B2* | 5/2011 | Lin | C23C 14/205 257/295 |
| 2003/0095372 | A1* | 5/2003 | Nakazawa | H01G 9/155 361/502 |
| 2005/0241137 | A1* | 11/2005 | Suzuki | H01G 9/042 29/592.1 |
| 2010/0178543 | A1* | 7/2010 | Gruner | B82Y 30/00 429/121 |
| 2011/0059361 | A1* | 3/2011 | Wilkening | H01M 4/136 429/218.1 |
| 2011/0200873 | A1 | 8/2011 | Hu et al. | |
| 2011/0304955 | A1* | 12/2011 | Zhou | B82Y 30/00 361/541 |
| 2012/0106028 | A1* | 5/2012 | Venkateswaran | H01G 11/00 361/503 |
| 2013/0224551 | A1 | 8/2013 | Hiralal et al. | |
| 2014/0030590 | A1 | 1/2014 | Wang et al. | |
| 2014/0212760 | A1 | 7/2014 | Zhao et al. | |

FOREIGN PATENT DOCUMENTS

| | | | |
|---|---|---|---|
| JP | 2003-142340 A | 5/2003 | |
| KR | 10-0532257 B1 | 11/2005 | |
| KR | 10-1209847 B1 | 12/2012 | |
| WO | WO 2012112818 A2 * | 8/2012 | ......... H01L 29/0665 |

OTHER PUBLICATIONS

Chen et al, High-performance transparent and stretchable all-solid supercapacitors based on highly aligned carbon nanotube sheets, 2014, Scientific Reports 4, Article No. 3612.*
Xie, et al. "Materials and Structures for Stretchable Energy Storage and Conversion Devices," Advanced Materials, vol. 26, pp. 3592-3617 (2014).
Li, et al. "Dynamic and Galvanic Stability of Stretchable Supercapacitors," Nano Letters, vol. 12, pp. 6366-6371 (2012).
Lee, et al. "Highly Stretchable and Highly Conductive Metal Electrode by Very Long Metal Nanowire Percolation Network," Advanced Materials, vol. 24, pp. 3326-3332 (2012).
Extended European Search Report dated Jul. 29, 2016 issued in corresponding European Patent Application No. 16150126.7.

* cited by examiner

FIG. 5

| Polyurethane | | | |
|---|---|---|---|
| L0=40 | | | |
| Strain (%) | L2 (mm) | L1 (mm) | Final Recovery (%) |
| 25 | 40.5 | 50.0 | 93.1 |
| 50 | 41.5 | 60.0 | 92.5 |
| 75 | 42.3 | 70.0 | 92.3 |
| 100 | 43.2 | 80.0 | 92.0 |
| 125 | 44 | 90.0 | 92.0 |
| 150 | 46.5 | 100.0 | 89.2 |
| 175 | 47 | 110.0 | 90.0 |
| 200 | 48 | 120.0 | 90.0 |
| 250 | 54 | 140.0 | 86.0 |
| 300 | 58 | 160.0 | 85.0 |

US 9,887,048 B2

STRETCHABLE SUPERCAPACITOR AND METHOD OF MANUFACTURING THE SAME

RELATED APPLICATION

This application claims priority under 35 U.S.C. §119 to Korean Patent Application No. 10-2015-0025923, filed on Feb. 24, 2015, in the Korean Intellectual Property Office, the disclosure of which is incorporated herein in its entirety by reference.

BACKGROUND

1. Field

The present disclosure relates to capacitors, and more particularly, to a stretchable supercapacitor and/or a method of manufacturing the same.

2. Description of the Related Art

A capacitor is a device for storing charges. A supercapacitor is also referred to as an electric double-layer capacitor or an electrochemical capacitor. When a voltage is applied to a supercapacitor, a double-layer is formed at an interface between an electrolyte and an electrode. Due to the double-layer, the supercapacitor can store a much larger amount of charges than a general capacitor.

A supercapacitor has drawn attention as an important storage means in renewable energy applications and/or fuel-efficient vehicle applications. The supercapacitor can store a large amount of energy in addition to having the advantages of a general capacitor. The supercapacitor may be one of the low cost substitutes for replacing a battery in various devices, such as power tools, mobile electronic devices, and electric motor vehicles. The energy density of the supercapacitor may be relatively lower than that of a battery, but the output density of the super-capacitor is much higher than that of the battery.

SUMMARY

Provided is a stretchable supercapacitor that may be applied to a volume-variable part or a surface transformer part.

Provided is a method of manufacturing the stretchable supercapacitor.

Additional aspects will be set forth in part in the description which follows and, in part, will be apparent from the description, or may be learned by practice of example embodiments.

According to example embodiments, a stretchable supercapacitor includes: a first current collector and a second current collector that each include an active material, and a separator disposed therebetween. The separator and each of the separator and the first and second current collectors includes an elastic polymer layer.

In example embodiments, the stretchable supercapacitor may further include a first electrode in contact with the first current collector, and a second electrode in contact with the second current collector.

In example embodiments, the first electrode may cover a whole surface of one surface of the first current collector. The second electrode may cover a whole surface of one surface of the second current collector.

In example embodiments, the first and second electrodes may have wrinkled surfaces.

In example embodiments, the first and second electrodes may include a silver nano wire layer that covers a graphene flake layer.

In example embodiments, each of the first and second electrodes may include one of a graphene electrode, a conductive rubber electrode, and a metal electrode.

In example embodiments, the first and second current collectors may have a 3-dimensional nano-pore structure.

In example embodiments, the elastic polymer layer in at least one of the separator, the first current collector, and the second current collector may include at least one of styrene-b-butadiene-b-styrene (SBS), polyurethane, polyurethane acrylate, acrylate polymer, acrylate terpolymer, and silicone-based polymer.

In example embodiments, the silicone-based polymer may include at least one of polydimethylsiloxane (PDMS), polyphenylm-ethylsiloxane, hexamethyldisiloxane, and ecoflex.

In example embodiments, the active material may be a conductive nano material.

In example embodiments, the conductive nano material may be one of carbon nanotube, graphene flake, and a metal wire.

According to example embodiments, a method of manufacturing a stretchable supercapacitor is provided. The method includes: forming a separator including a first surface opposite a second surface; forming a first current collector; forming a second current collector; and attaching the first and second current collectors to the first surface of the separator and the second surface of the separator, respectively, so the second current collector faced the first current collector. Each of the separator and the first and second current collectors includes an elastic polymer layer.

In example embodiments, the forming the first current collector may include: forming a first elastic polymer layer having a 3-dimensional nano-pore structure on a base substrate; and soaking the first elastic polymer layer in a solution that includes an active material. The first elastic polymer may be soaked in the solution that includes the active material for a desired and/or alternatively predetermined time.

In example embodiments, the forming the second current collector may include: forming a second elastic polymer layer having a 3-dimensional nano-pore structure on a base substrate; and soaking the second elastic polymer layer in a solution that includes an active material. The second elastic polymer may be soaked in the solution that includes the active material for a desired and/or alternatively predetermined time.

The method may further include forming a first electrode on the first current collector attached to the separator; and forming a second electrode on the second current collector attached to the separator.

BRIEF DESCRIPTION OF THE DRAWINGS

These and/or other aspects will become apparent and more readily appreciated from the following description of non-limiting embodiments, taken in conjunction with the accompanying drawings in which:

FIG. 5 is a table summarizing the results of measuring a strain and restoration force of a separator of a stretchable supercapacitor according to example embodiments;

DETAILED DESCRIPTION

Figure 1:
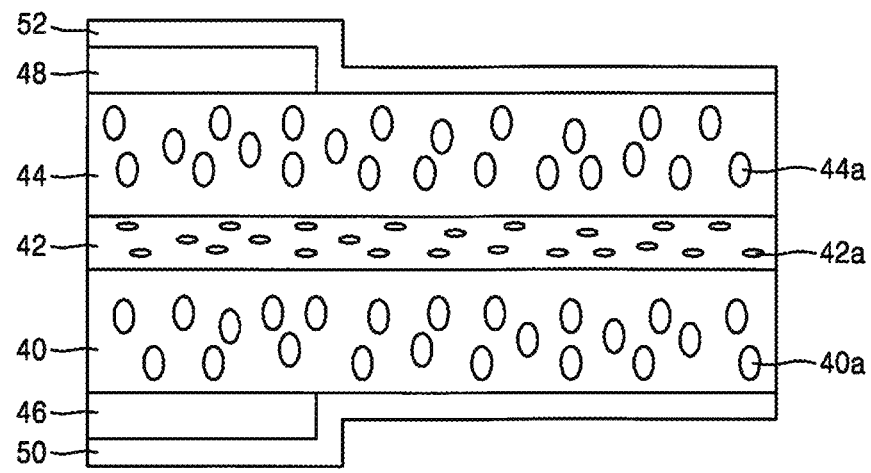
FIGS. 1 through 3 are cross-sectional views illustrating a stretchable supercapacitor according to example embodiments.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

First, a stretchable supercapacitor according to example embodiments will be described.

Figure 2:
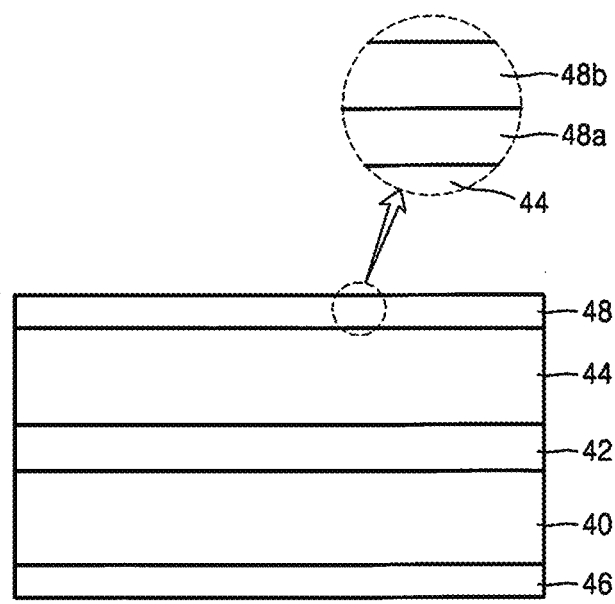
Figure 3:
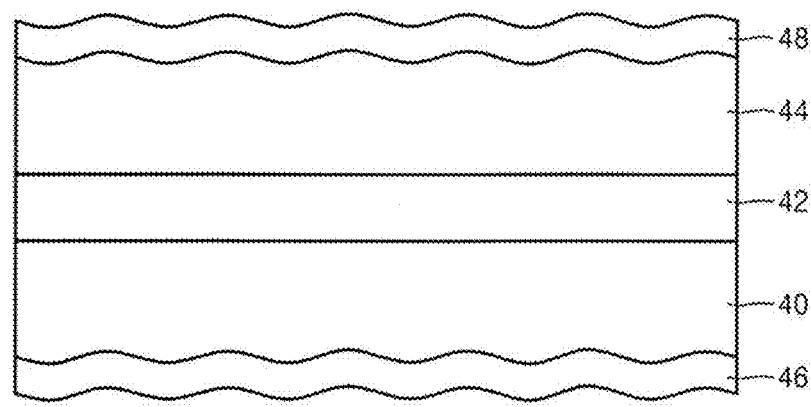

FIGS. 1 through 3 are cross-sectional views illustrating a stretchable super-capacitor according to example embodiments.

Referring to FIG. 1, the super-capacitor may include a first current collector 40, a separator 42, and a second current collector 44. A first electrode 46 is formed on a lower surface of the first current collector 40. A second electrode 48 is formed on an upper surface of the second current collector 44. The first current collector 40 and the first electrode 46 are covered by a first passivation film 50. The second current collector 44 and the second electrode 48 are covered by a second passivation film 52. The first and second passivation films 50 and 52 may be polydimethylsiloxane (PDMS) or echoflex.

Figure 4:
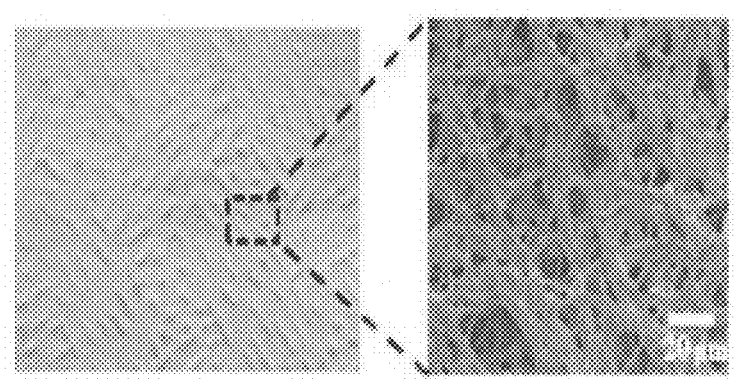
FIG. 4 is a scanning electron microscope (SEM) image of an optical image of a surface of a current collector and a desired and/or alternatively predetermined region of the current collector when the current collector is formed of a styrene-b-butadiene-b-styrene (SBS) in a stretchable supercapacitor according to example embodiments.

The first and second current collectors 40 and 44 are elastic polymer layers having a high stretching characteristic. For example, each of the first and second current collectors 40 and 44 may be stretchable about 300%, and have a restoration force of 90% or more within a majority strain region. The elastic polymer layer that is used for forming the first and second current collectors 40 and 44 may include at least one or a combination of more than two of, for example, styrene-b-butadiene-b-styrene (SBS), polyurethane, polyurethane acrylate, acrylate polymer, acrylate terpolymer, and silicone-based polymer. The silicon-based polymer may include at least one of PDMS, polyphenylmethylsiloxane, hexamethyldisiloxane, and ecoflex. The first and second current collectors 40 and 44 may be formed by using an electro-spinning method. The first and second current collectors 40 and 44 have a 3-dimensional nano-pore structure. Accordingly, a contact area of the first and second current collectors 40 and 44 is much broader than when the first and second current collectors 40 and 44 do not have a nano pore structure. FIG. 4 shows an example of the 3-dimensional nano-pore structure.

The first and second current collectors 40 and 44 respectively include active materials 40a and 44a. The active materials 40a and 44a may be respectively uniformly distributed on entire regions of the first and second current collectors 40 and 44. Since the first and second current collectors 40 and 44 have a 3-dimensional nano-pore structure, in a process (a coating process) of supplying the active material 40a and 44a to the first and second current collectors 40 and 44, the active material 40a and 44a may be absorbed in everywhere of the first and second current collectors 40 and 44. The process of supplying the active material 40a and 44a may be a coating process of the active material 40a and 44a.

In this manner, the content of the active material 40a and 44a in the first and second current collectors 40 and 44 is more than when the 3-dimensional nano-pore structure is not present. Since the first and second current collectors 40 and 44 have a 3-dimensional nano-pore structure, ions in the first and second current collectors 40 and 44 may be 3-dimensionally freely moved in the first and second current collectors 40 and 44. Accordingly, the characteristic of the first and second current collectors 40 and 44 may be better than when the 3-dimensional nano-pore structure is not present.

The active material 40a and 44a may be, for example, carbon nanotube (CNT), graphene flake, metal nano-wires, or other nano materials. The active material 40a of the first current collector 40 and the active material 44a of the second current collector 44 may be same or different from each other. When the first and second current collectors 40 and 44 are soaked in a solution that includes the active material 40a and 44a, the active material 40a and 44a may be impregnated into the first and second current collectors 40 and 44. The separator 42 may be the elastic polymer layer. Since the elastic polymer layer is used as the separator 42, high ion conductivity may be maintained and thermal and electrochemical stability may be maintained. The separator 42 includes an electrolyte 42a. A material for forming the first and second electrodes 46 and 48 may be, for example, graphene or a conductive rubber. At this point, the conductive rubber may be rubber including a conductive nano material. The conductive nano material may be, for example, CNT or graphene flake. The conductive rubber may be formed by soaking rubber in a solution containing the conductive nano material for a desired and/or alternatively predetermined time.

Referring to FIG. 2, the first electrode 46 is formed to cover a lower surface of the first current collector 40. The first electrode 46 may contact the whole lower surface of the first current collector 40. The second electrode 48 is formed to cover an upper surface of the second current collector 44. The second electrode 48 may contact the whole upper surface of the second current collector 44. Also, as depicted in a circle of FIG. 2, the second electrode 48 may include a first layer 48a and a second layer 48b that covers the first layer 48a. The first layer 48a may include graphene flake. The second layer 48b may include a silver nano wire that covers the graphene flake. The configuration of the second electrode 48 that includes the first layer 48a and the second layer 48b may be applied to the configuration of the first electrode 46.

The first and second electrodes 46 and 48 may be metal electrodes, and at this point, as depicted in FIG. 3, surfaces of the first and second electrodes 46 and 48 may be formed to have creases. This type of creased surface may be formed such that, after depositing metal films that may used for the first electrode 46 on the lower surface of the first current collector 40 and the second electrode 48 on the upper surface of the second current collector 44 in a state that a stack in which the first current collector 40, the separator 42, and the second current collector 44 are sequentially stacked is stretched by pulling to both directions, strain applied to the stack is removed. When the strain is removed, the stack is restored due to the restoration force of each of the materials. However, the deposited metal films have no restoration force, and thus, as depicted in FIG. 3, the first and second electrodes 46 and 48 have wrinkled surfaces. As the deposited metal films have wrinkled surfaces, interfaces of the first and second current collectors 40 and 44 to which the metal films are attached may have the same type of wrinkles as the wrinkled surfaces of the metal films.

FIG. 4 is an optical image (left side) and a scanning electron microscope (SEM) image (right side) of surfaces of an SBS elastic polymer layer that is used in the first and second current collectors 40 and 44.

Referring to the drawing of right side of FIG. 4, a lot of nano pores are seen in the SBS elastic polymer layer.

FIG. 5 is a table summarizing test results of the stretching characteristic of the separator 42, that is, the test results of measuring a restoration force of the separator according to the degree of strain. In order to obtain the test results, polyurethane (PU) was used as the separator 42. In table of FIG. 5, L0=40 denotes that a length of the separator 42 is 40 mm under no strain. Also, L1 indicates a stretched length due to strain, and L2 indicates a restored length after the strain was removed. In the above tests, strain is changed so that the separator 42 is stretched from 25% to 300%.

Referring to FIG. 5, the final recoveries of the separator 42 were mostly more than 90% in the strain ranges. At the strains at which the length of the separator 42 was stretched 250% to 300%, the final recovery rate was slightly lowered but the final recovery rate was greater than 85%.

Next, the charge-and-discharge characteristics of the stretchable supercapacitor according to strain will be described with reference to FIGS. 6 through 13. For this test, a supercapacitor having a size of 1 cm×1 cm was used. In the supercapacitor used for the test, the separator was a PU film and the current collector was an SBS. Cu foils are used as electrodes. Thicknesses of the separator and the current collector are from 50 um to 100 um.

FIGS. 6 through 13 are graphs showing charge-and-discharge characteristics according to strain of a stretchable supercapacitor according to example embodiments. In FIGS. 6 through 13, horizontal axes indicate time s, and vertical axes indicate potential V.

Figure 6:
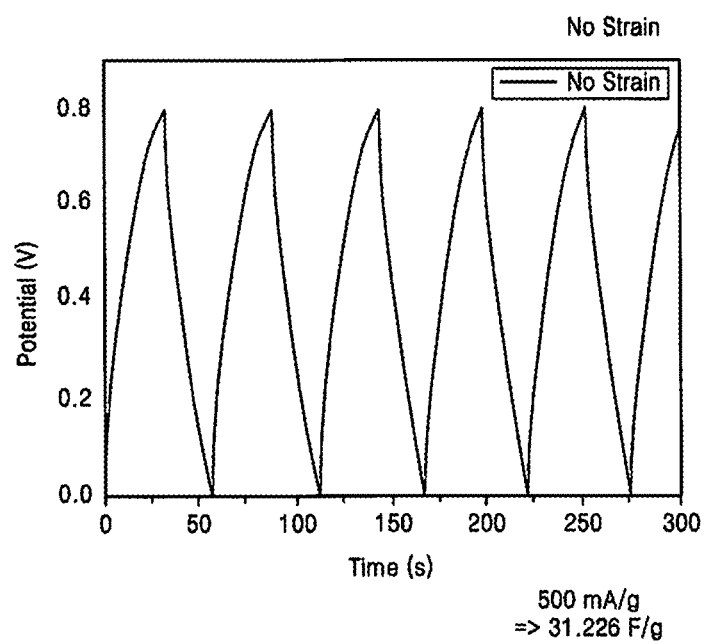
FIGS. 6 through 13 are graphs illustrating charge-and-discharge characteristics of a stretchable supercapacitor according to strain, according to example embodiments.

FIG. 6 shows a charge-and-discharge characteristic of the supercapacitor under no strain, that is, when the supercapacitor is not stretched.

Figure 7:
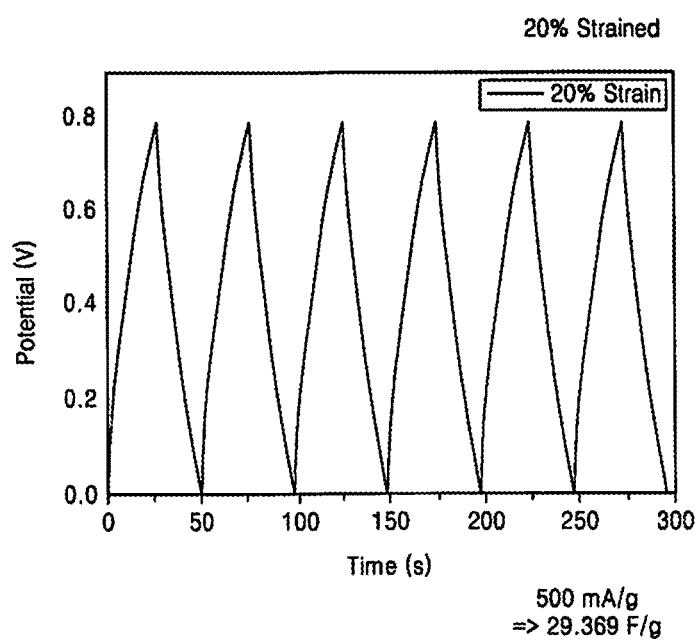

FIG. 7 shows a charge-and-discharge characteristic of the supercapacitor when the strain with respect to the supercapacitor is 20%, that is, the supercapacitor is stretched 20%.

Figure 8:
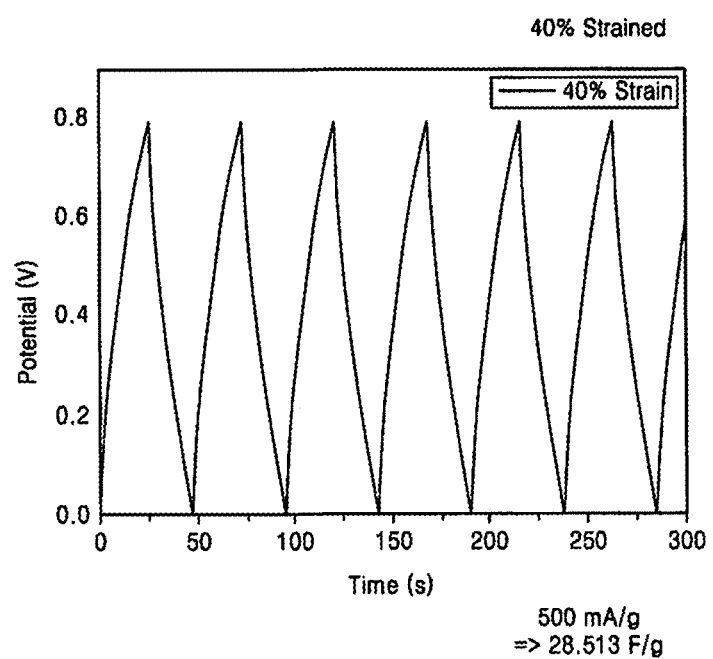

FIG. 8 shows a charge-and-discharge characteristic of the supercapacitor when the strain with respect to the supercapacitor is 40%, that is, the supercapacitor is stretched 40%.

Figure 9:
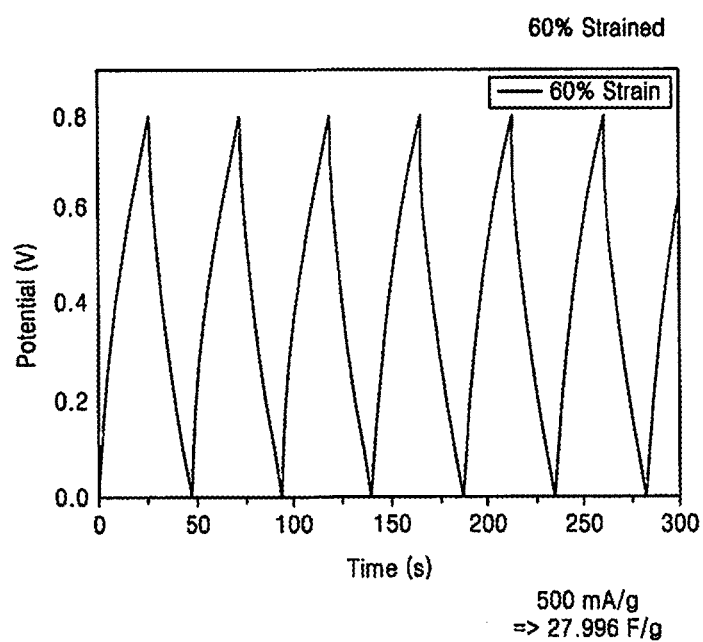

FIG. 9 shows a charge-and-discharge characteristic of the supercapacitor when the strain with respect to the supercapacitor is 60%, that is, the supercapacitor is stretched 60%.

Figure 10:
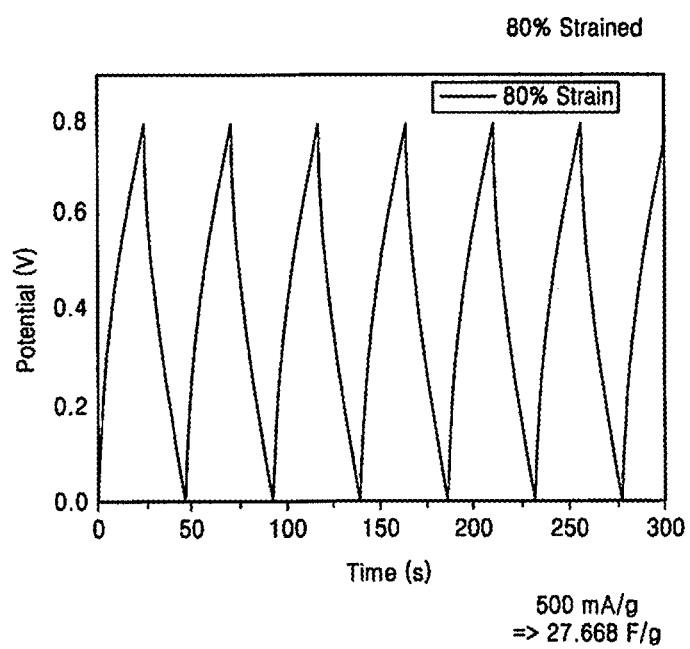

FIG. 10 shows a charge-and-discharge characteristic of the supercapacitor when the strain with respect to the supercapacitor is 80%, that is, the supercapacitor is stretched 80%.

Figure 11:
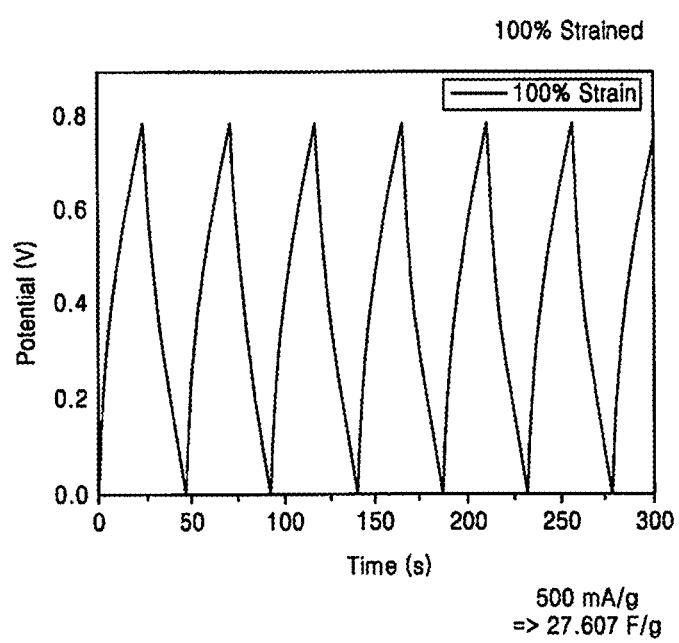

FIG. 11 shows a charge-and-discharge characteristic of the supercapacitor when the strain with respect to the supercapacitor is 100%, that is, the supercapacitor is stretched 100%.

Figure 12:
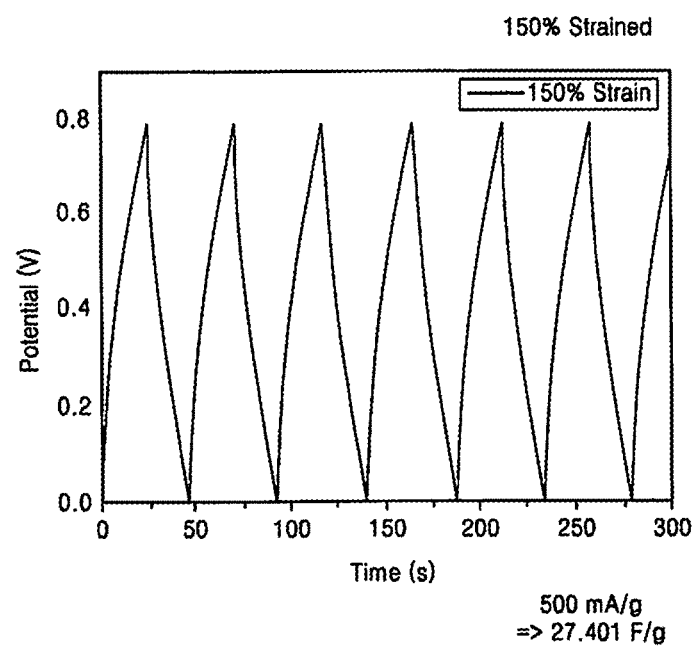

FIG. 12 shows a charge-and-discharge characteristic of the supercapacitor when the strain with respect to the supercapacitor is 150%, that is, the supercapacitor is stretched 150%.

Figure 13:
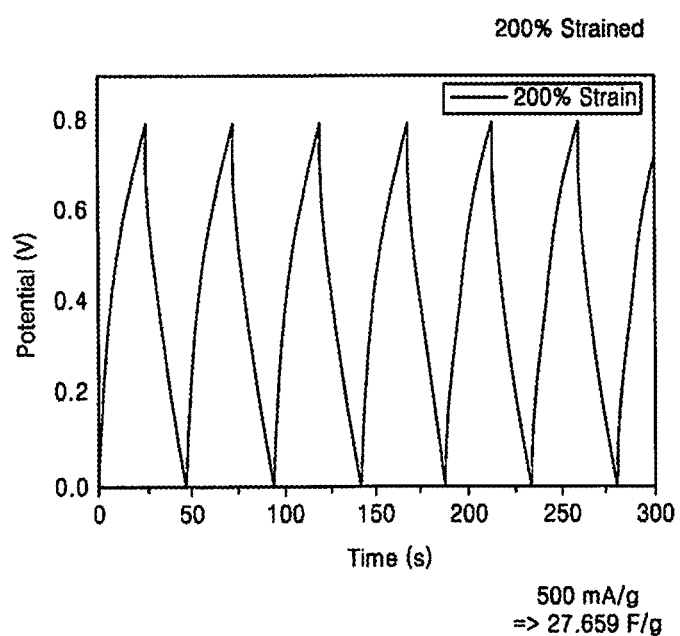

FIG. 13 shows a charge-and-discharge characteristic of the supercapacitor when the strain with respect to the supercapacitor is 200%, that is, the supercapacitor is stretched 200%.

Referring to FIGS. 7 through 13, until the strain reaches to 80%, gaps between charge and discharge of the supercapacitor are slightly reduced according to the increase in the strain, but the gaps are an ignorable level. When the strain with respect to the supercapacitor is greater than 80%, the charge-and-discharge cycle is not changed. That is, the charge-and-discharge characteristic of the supercapacitor is stable. Also, the maximum potential value does not change according to the strain. In each of the drawings, the F/g value indicates a capacitance at each strain.

Figure 14:
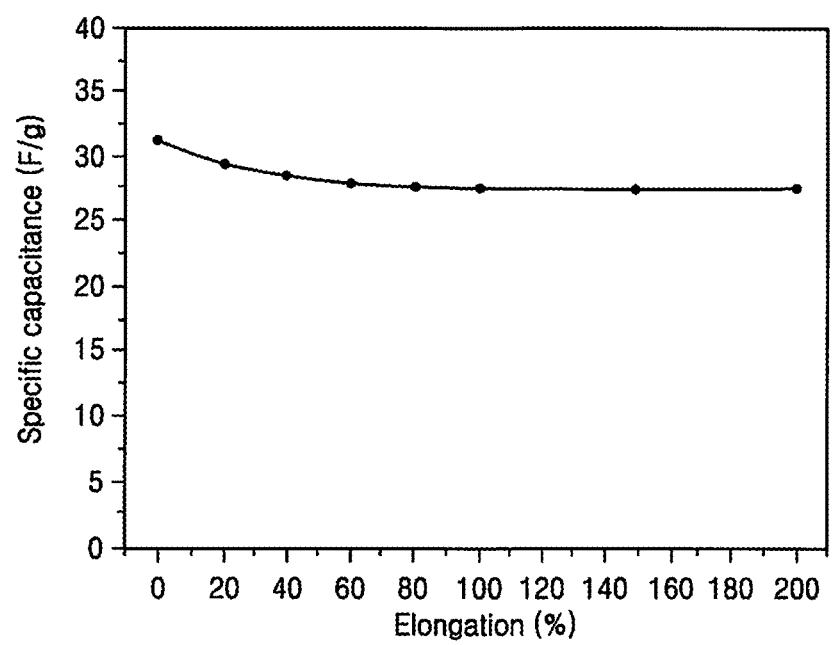
FIG. 14 is a graph illustrating a variation of a capacitance according to a strain force of a stretchable super-capacitor according to example embodiments.

In the above tests, capacitances according to strains were measured together with potentials, and the measuring results are shown in FIG. 14. FIG. 14 is a graph showing the variation of capacitance according to strain of the stretchable supercapacitor according to example embodiments.

Referring to FIG. 14, the capacitance of the supercapacitor is the greatest when there is no strain, that is, the supercapacitor is not stretched. When the length of the supercapacitor is gradually increased due to the strain, the capacitance of the supercapacitor is reduced. The capacitance when the strain of the supercapacitor is 200% is reduced by about 11% compared when there is no strain. However, considering the degree of strain of the supercapacitor, the reduction of the capacitance may be regarded as a small variation.

Therefore, it is considered that the supercapacitor shows a stable operation characteristic with respect to various magnitudes of strains.

Next, a method of manufacturing a stretchable supercapacitor according to example embodiments will be described with reference to FIGS. 1, 15, and 16. Like reference numerals are used to indicate substantially the same elements.

Referring to FIG. 1, a separator 42 that includes an electrolyte 42a is formed. The separator 42 may be formed by soaking a polymer layer (which is later used for the separator 42) in an electrolyte solution for a desired and/or alternatively predetermined time. Alternatively, the electrolyte solution may be coated on the elastic polymer layer. After forming the separator 42, first and second current collectors 40 and 44 are formed. The first and second current collectors 40 and 44 are respectively attached to a lower surface and an upper surface of the separator 42.

The current collector 40 may be formed as follows.

Figure 15:
FIGS. 15 and 16 are schematic cross-sectional views illustrating a method of forming a current collector of a stretchable super-capacitor according to example embodiments.
Figure 16:
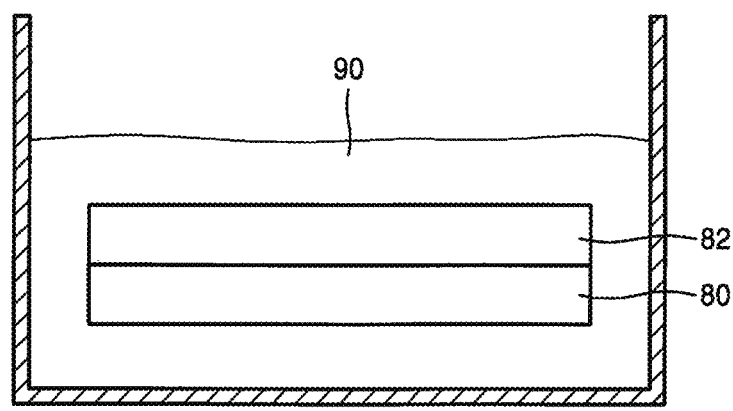

Referring to FIG. 15, an elastic polymer layer 82 to be used as a current collector is formed on a base substrate 80. The elastic polymer layer 82 is formed by using an electrospinning method, and thus, a 3-dimensional nano-pore structure is formed in the elastic polymer layer 82. As depicted in FIG. 16, when the elastic polymer layer 82 is soaked in an active material solution 90 for a desired and/or alternatively predetermined time, an active material moves through the 3-dimensional nano-pore structure, and is absorbed in everywhere of the elastic polymer layer 82. In this manner, the first current collector 40 is formed. After separating the first current collector 40 from the base substrate 80, the first current collector 40 is attached to a lower surface of the separator 42. The second current collector 44 may also be formed as the same way as the first current collector 40.

Next, after attaching the first and second current collectors 40 and 44 to the separator 42, a first electrode 46 is formed on the first current collector 40 and a second electrode 48 is formed on the second current collector 44. As depicted in FIG. 2, the first and second electrodes 46 and 48 respectively may be formed to cover a lower surface of the first current collector 40 and an upper surface of the second current collector 44. At this point, the first and second electrodes 46 and 48 may be formed as a wrinkled form as depicted in FIG. 3.

The first and second current collectors 40 and 44 and the separator 42 of the stretchable supercapacitor according to example embodiments respectively have intrinsic characteristics with a high stretching characteristic and high recovery force. Accordingly, the stretchable supercapacitor may be used as an energy storing device and/or an energy supplying device by being applied to a stretchable device. Also, the stretchable supercapacitor may be applied to devices in which a volume is changed or surface transformation occurs, and thus, the stretchable supercapacitor may be used as wearable type energy storage devices and/or energy supplying devices.

Also, since the current collector of the stretchable supercapacitor has a 3-dimensional nano-pore structure therein, a surface area of the current collector is increased, and since ions may be 3-dimensionally moved, a further large amount of charges may be stored. Accordingly, in a process of stretching and recovery of the stretchable supercapacitor, charge and discharge may be smoothly achieved.

The stretchable supercapacitor may be used by combining with other stretchable devices, for example, transistors, light-emitting diodes, solar cells, or sensors. Accordingly, the stretchable supercapacitor may be used in a wearable electronic device and/or a patch-type bio-medical sensor.

While one or more example embodiments have been described with reference to the figures, it will be understood by those of ordinary skill in the art that various changes in form and details may be made therein without departing from the spirit and scope of inventive concepts as defined by the following claims.

What is claimed is:

1. A stretchable supercapacitor, comprising:
a first current collector and a second current collector that each include an active material that is impregnated therein,
the second current collector on the first current collector; and
a separator between the first current collector and the second current collector,
the separator including an electrolyte,
each of the separator, the first current collector, and the second current collector including an elastic polymer layer, and the elastic polymer layer of the first current collector and the elastic polymer layer of the second current collector each having a 3-dimensional nano-pore structure.

2. The stretchable supercapacitor of claim 1, further comprising:
a first electrode in contact with the first current collector; and
a second electrode in contact with the second current collector.

3. The stretchable supercapacitor of claim 2, wherein the first electrode covers a whole surface of one surface of the first current collector.

4. The stretchable supercapacitor of claim 2, wherein the second electrode covers a whole surface of one surface of the second current collector.

5. The stretchable supercapacitor of claim 2, wherein the first electrode and the second electrode have wrinkled surfaces.

6. The stretchable supercapacitor of claim 2, wherein each of the first electrode and the second electrode include a silver nano wire layer that covers a graphene flake layer.

7. The stretchable supercapacitor of claim 2, wherein each of the first electrode and the second electrode include one of a graphene electrode, a conductive rubber electrode, and a metal electrode.

8. The stretchable supercapacitor of claim 1, wherein the elastic polymer layer in at least one of the separator, the first current collector, and the second current collector includes at least one of styrene-b-butadiene-b-styrene (SBS), polyurethane, polyurethane acrylate, acrylate polymer, acrylate terpolymer, and silicone-based polymer.

9. The stretchable supercapacitor of claim 8, wherein the silicone-based polymer includes at least one of polydimethylsiloxane (PDMS), polyphenylm-ethylsiloxane, hexamethyldisiloxane, and ecoflex.

10. The stretchable supercapacitor of claim 1, wherein
the elastic polymer layer in each of the first current collector and the second current collector includes SBS, and
the elastic polymer layer in the separator includes polyurethane.

11. The stretchable supercapacitor of claim 1, wherein the active material is a conductive nano material.

12. The stretchable supercapacitor of claim 11, wherein the conductive nano material is one of carbon nanotube, graphene flake, and a metal wire.

13. A method of manufacturing a stretchable supercapacitor, the method comprising:
forming a first current collector the forming the first current collector including forming a first elastic polymer layer having a 3-dimensional nano-pore structure on a based substrate, and soaking the first elastic polymer layer in a first solution that includes a first active material;
forming a second current collector including a second elastic polymer layer;
forming a separator including a third elastic polymer layer, the separator including a first surface opposite a second surface;
attaching the first current collector to the first surface of the separator; and
attaching the second current collector to the second surface of the separator to face the first current collector.

14. The method of claim 13, wherein the forming the second current collector includes:
forming the second elastic polymer layer having a 3-dimensional nano-pore structure on a corresponding base substrate; and
soaking the second elastic polymer layer in a solution that comprises a second active material.

15. The method of claim 13, further comprising:
forming a first electrode on the first current collector attached to the separator; and
forming a second electrode on the second current collector attached to the separator.

16. The method of claim 15, wherein the first electrode and the second electrode have wrinkled surfaces.

17. The method of claim 15, wherein each of the first electrode and the second electrode include:
a graphene flake layer; and
a silver nano wire layer that covers the graphene flake layer.

18. The method of claim 15, wherein each of the first electrode and the second electrode is one of a graphene electrode, a conductive rubber electrode, and a metal electrode.

19. The method of claim 13, wherein
the first elastic polymer layer comprises at least one of SBS, polyurethane, polyurethane acrylate, acrylate polymer, acrylate terpolymer, and silicone-based polymer,
the second elastic polymer layer comprises at least one of SBS, polyurethane, polyurethane acrylate, acrylate polymer, acrylate terpolymer, and silicone-based polymer, and
the third elastic polymer layer comprises at least one of SBS, polyurethane, polyurethane, acrylate, acrylate polymer, acrylate terpolymer, and silicone-based polymer.

* * * * *